United States Patent [19]

Matsunaga

[11] Patent Number: 5,247,670
[45] Date of Patent: Sep. 21, 1993

[54] NETWORK SERVER
[75] Inventor: Yoshifumi Matsunaga, Tokyo, Japan
[73] Assignee: Fuji Xerox Co., Ltd., Tokyo, Japan
[21] Appl. No.: 321,134
[22] Filed: Mar. 9, 1989
[30] Foreign Application Priority Data
   Mar. 16, 1988 [JP] Japan .................................. 63-60613
[51] Int. Cl.⁵ .................................................. G06F 15/16
[52] U.S. Cl. ...................................... 395/650; 364/940; 364/281.3; 364/284.4; 364/284.2; 364/DIG. 1
[58] Field of Search ....................... 395/200, 650, 800; 364/200 MS File, 900 MS File

[56] References Cited

U.S. PATENT DOCUMENTS

| | | | |
|---|---|---|---|
| 4,387,427 | 6/1983 | Cox | 364/200 |
| 4,500,960 | 2/1985 | Babecki | 364/200 |
| 4,754,395 | 6/1988 | Weisshaar | 364/200 |
| 4,769,772 | 9/1988 | Dwyer | 364/200 |
| 4,780,821 | 10/1988 | Crossley | 364/200 |
| 4,819,159 | 4/1989 | Shipley | 364/200 |
| 4,825,354 | 4/1989 | Agrawal | 364/200 |
| 4,835,685 | 5/1989 | Kun | 364/200 |
| 4,887,204 | 12/1989 | Johnson | 364/200 |
| 4,937,284 | 6/1990 | Masai | 364/200 |
| 4,949,248 | 8/1990 | Caro | 364/200 |

FOREIGN PATENT DOCUMENTS

| | | |
|---|---|---|
| 077008 | 4/1983 | European Pat. Off. . |
| 205946 | 12/1986 | European Pat. Off. . |
| 278317 | 8/1988 | European Pat. Off. . |
| 2187009A | 8/1987 | United Kingdom . |

Primary Examiner—Robert B. Harrell
Assistant Examiner—Eric Coleman
Attorney, Agent, or Firm—Finnegan, Henderson, Farabow, Garrett & Dunner

[57] ABSTRACT

A server in a network for performing services according to requests for service from clients on the network. The server includes a memory area for storing user commands, a memory area for storing a file program, an information exchange area, a temporary storage area, a service program area, and a control program area.

7 Claims, 5 Drawing Sheets

NETWORK SERVER

FIELD OF THE INVENTION

The present invention relates to a server for a communication network, and more particularly to a server for a communication network service using batch processing where the service is executed according to predetermined steps. The server of the present invention realizes an effective service for the communication network of automated vending style. An automated vending style server is defined as a server including mechanism and space to receive and hold data through a network.

BACKGROUND OF THE INVENTION

Telecommunication protocol and data formats for communication networks have been standardized world-wide. With this standardization, and under OSI (Open Systems Interconnection) protocol, communications networks composed of various types of hardware may communicate with each other.

With OSI, users of computer system can build the system most appropriate for their purpose. In other words, where before users often had problems connecting varying types of hardware to the network, OSI allows users to connect to a network regardless of the type of hardware they employ. In this context, users can integrate a total network system using various hardware, such as a combination of a work station made by "A company", a printer made by "B company", and a facsimile machine made by "C company", using the combination that best fits their needs.

The move toward network utilization has occurred first in the business world, and various network services are available for the business customer. One well-known example is online data retrieval from data bases over public telephone lines. However, the present invention concerns local area networks, which recently have attracted a good deal of public attention. "8000 INS" (XINS), which is sold by Fuji Xerox Corp., is representative of this type of network service wherein the functions performed by the hardware appear to the user to be network services. For example, these functions can be print servers, file servers, or mail servers.

A print server prints out a hard copy of the indicated text or data (with a laser printer, for example) in response to a command from a work station operating as a user terminal. A file server performs file handling, such as storing and sending indicated files to and from the customer, in response to a command from the work station operating as a user terminal. A mail server performs a mailing service by which private mail boxes are managed, such as writing a mail message that was sent from another station to the indicated address or such as sending a mail message that is required from the indicated mail box to another customer.

In the "8000 INS" system, the word "server" is used to described a combined "server" and "work station", thus indicating that specified services are supplied to a client on the work station of the network as a user. It is predicted that in the near future various kind of services, including those services described above, will be available in the network system.

Currently, to add a new service that has previously been unavailable in the network system, it is usually necessary to use a program as an interface for the newly added service. This program must be loaded on the work station at the client side. However, adding a new service to the network as described above requires some changes in the previously existing system. This requirement increases dependency on the previously existing system, decreases the flexibility of the total network system, and makes it difficult to have various kinds of services on the network system.

In this context, it becomes important to be able to add a new service while still maintaining the flexibility of the total network system to accept various kinds of services to be supplied. Herein, newly added services would not require any functional changes to an existing network system.

To realize the aforesaid requirement to maintain system flexibility, some systems have been proposed to add new services to the network without any new interface at the client side in the system.

One example of such a system is demonstrated in FIG. 6. It employs an interface for an electronic mailing system. In the figure, a client 12, such as a work station; a mail server 13; and a new server 14, by which newly added services are supplied, are connected to a bus cable 11. In this example, a mail box 15, which is used only by the new server 14, is prepared in the mutual mail server 13. When the client 12 sends an electronic mail message that concerns the new server 14, the mail message is stored in the mail box 15. On that occasion, among the indexes of the mail such as a title 17, a message 18, and data 19, which are listed on the electronic mail sheet 16, title 17 or message 18 is interpreted as a command for the service, and the service is executed for the associated data 19 or message 18.

The newly added server 14 checks if any mail has been sent to its own mail box 15 within a predetermined time interval, and when a mail message has been sent to it, executes a predetermined process for the mail message and stores the result of the process in a predetermined storage area or in a storage area indicated by the mail message.

A second example of such a system is demonstrated in FIG. 7. In the figure, the same reference numerals are used to show the same equipment of FIG. 6. For the system in FIG. 7, to file server 21 is employed instead of the mail server 13 in FIG. 6. The file server 21 includes a storage area 22 to serve the newly added service 14 corresponding to the server 14 in FIG. 6. The storage area 22 has a layered structure to match the services to be used with various stages.

The difference between the system of FIG. 7 and that of FIG. 6 is that the mail box 15 in FIG. 6 is theoretically prepared for each individual use, while in the system of FIG. 7, the data which are managed by the file server 21 can be possessed by multiple users because the file server 21 itself performs file handling.

A third system could be a combination of the first and second types of systems. In that system, a command to perform the ordered service for the indicated data in the specified file drawer and to store the result in the specified file drawer under the indicated directory is conveyed using electronic mail.

In the first proposed system of FIG. 6, data and commands are handled through the mail server 13. The structuring of the title 17 and messages 18 in the electronic mail sheet 16 matches the various services and does not require a special interface to use the newly added service for each client.

In this first proposed system, the newly added server 14 may cause a problem in the mail server 13 or may impede logical access to the mail server 13 because of, for example, errors in the program to be applied for the server 14. In case of such an accident, the mail box 15 of the server 14 may be destroyed which would affect not only the mail box 15 but the mail boxes for multiple users because there are many mail boxes collectively arranged with the aforesaid server 14 and the damage caused by error in the program may propagate to the other mail boxes therein. In other words, in the first proposed system, the more active the server 14 becomes, the more the service depends on the network, leading to decreased credibility of the system. The possibility of problems increases when the results of processed data are returned to the users.

The second proposed system has the same possible problems. In the file server 21, which can be accessed by multiple users, once a problem occurs, it tends to propagate to third parties who have no relation to the aforementioned server 14, causing damage such as lost data.

The third proposed system contains very sophisticated services, since the system itself is made up of a combination of the first and second systems. However, conversely, the factors that decrease credibility are increased in the system.

As described above, with regard to systems in which mail servers 13 or file servers 21 are used, close connection to the data communication decreases network dependability. At the same time, such connections makes it more difficult to add or to remove a server from the system once the system has been in operation. For example, the following describes an introduction of a new file server 21 to the second type of system. An operator of the system or a program in the system prepares a new memory area for the working area to be used for the new service in the file server 21, which has already been used. Even when the new file server 21 is prepared independently of the previously existing file server, the total number of the nodes becomes two. In short, because the cost and occupied space for the working area are increased, adding and removing a server is problematic.

The popularity of OSI requires dependability of each node in the network, since the propagation of damage by the interference of nodes is undesirable.

SUMMARY OF THE INVENTION

The present invention is intended to overcome the previously stated difficulties of network server systems.

An object of the present invention is to provide a network server that has a decreased dependency on the network system and at the same time that can be easily added to and removed from the system.

This object is accomplished in accordance with the present invention by a network server comprising:

(a) a file server for sending and receiving files to and from a communication network, and (b) data processing means for processing information stored in the aforesaid server.

BRIEF DESCRIPTION OF THE FIGURES

The manner by which the above objects, and other objects, features, and advantages of the present invention are attained will be fully apparent from the following detailed description when it is considered in view of the drawings, wherein.

DESCRIPTION OF THE PREFERRED EMBODIMENTS

A network server in accordance with the present invention possesses an information processing function not found in previously existing servers. Therefore, users can store the data to be processed in a specified file drawer, which has a layered structure corresponding to the service to be applied, and can ask for the service in the same manner as in the prior art. The results of the executed data are stored in an appropriate area in the file drawer. Users can retrieve the results directly. In this context, the server in accordance with the present invention appears to the network as a file server in the prior art technique, and network credibility can be maintained at the same level as it is for existing file servers.

There are two reasons why the server system in accordance with the present invention generally employs a file service system instead of a mail service system. In a mail service system, sending information itself should be considered to be the activity of the network. Due to this fact, it is possible to destroy a mail box on the same network by erroneously sending data information exceeding the capacity of the box. From the view point of maintaining the credibility of the system, the mail box system causes a problem.

In the file service system, there is a possibility of using the layered structure of a storage function for classifying the kind of the service. Once the kind of service has been identified, a user can separate the service and data for it. Conversely, in the mail service system, it is unusual for a mail box for multiple users to be used with each individual mail box at the same time. Accordingly, a name of the required service should be written on the mail sheet instead.

The present invention will now be described in further detail with reference to the accompanying drawings. However, the following examples are given to aid in the understanding of the present invention, and variations may be made by one skilled in the art without departing from the spirit and scope of the present invention.

Figure 1:
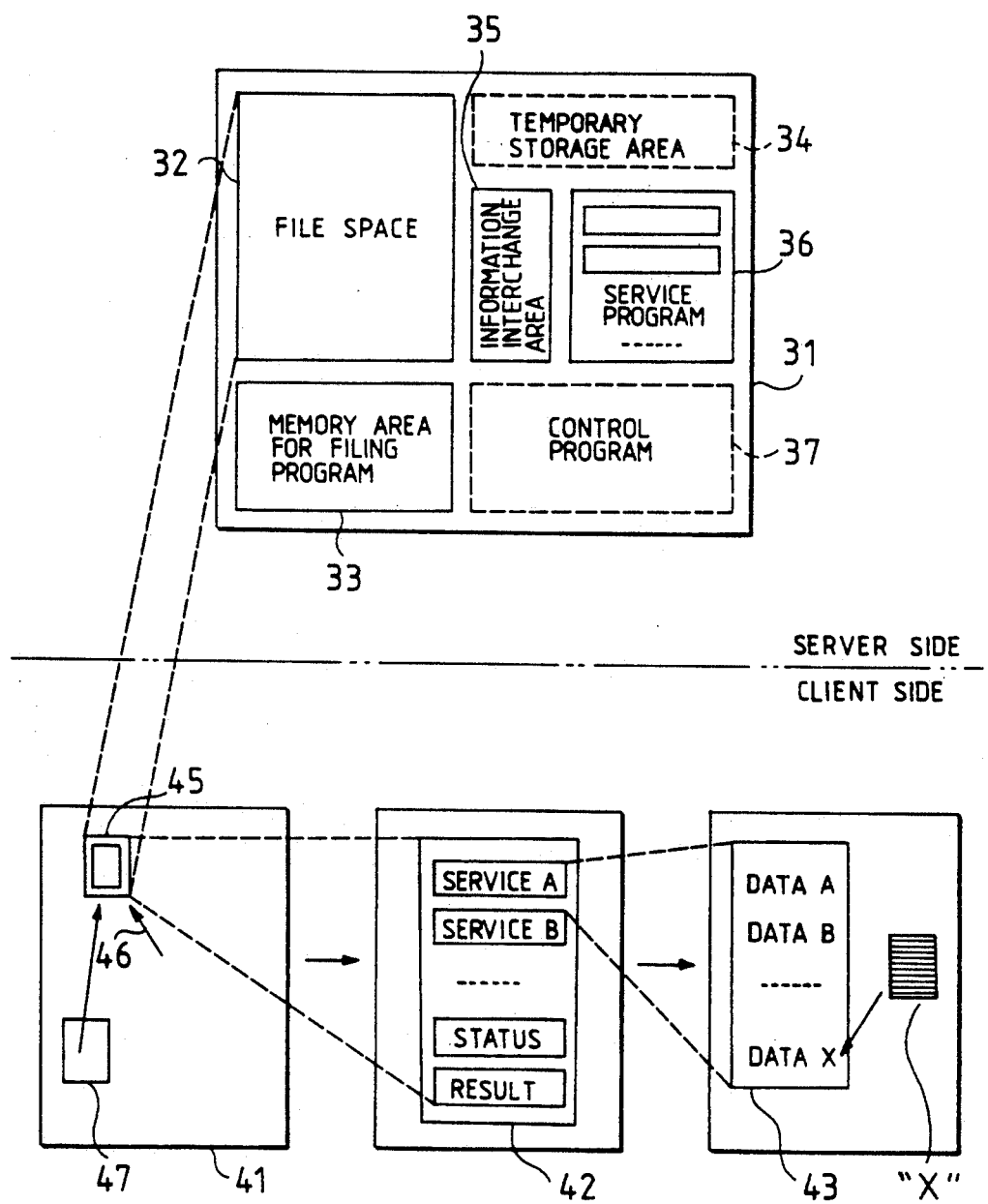
FIG. 1 shows an example of a server according to the present invention and a picture on a display terminal at the end user.

FIG. 1 shows a preferred embodiment of the network system in which the server of the present invention is employed. FIG. 1 depicts a viewpoint from both ends of the service, i.e., a supplier side as a server and a service user side as a client. The server 31 in FIG. 1 differs from the file server in the prior art technique as was described above.

(i) The structure of the server

The aforesaid server 31 includes the following functions:

(a) a memory area for filing (also called a file space) 32 wherein the indicated files are stored;

(b) a memory area for filing program 33 in which an operation program to perform a function of the file server is stored;

(c) a memory area for service programs 36 in which the operation programs to perform supplied services are stored. These operation programs correspond to the processing unit for the service;

(d) an information interchange area 35 for passing data information between the filing functions and the service function. Information interchange area 35 includes the information output function that reads out the data information from the specified memory area for filing and sends the data to the processing unit, and also includes the result storage means that receives a result of the data processing from the processing unit to store at the indicated memory area for filing;

(e) a temporary storage area 34 in which data to be processed by the service processing unit are temporarily stored independently. Temporary storage area 34 is arranged between the file server and the service processing unit;

(f) a memory area for control programs 37 in which the control programs to perform ordering and scheduling of services are stored. These operation programs correspond to the processing unit itself;

(g) a central processing unit (CPU) (not shown); and (h) a temporary storage area (not shown), which may be included in a random access memory (RAM) and in which required data are stored temporarily to be processed in the operation.

(ii) An example of the operation of the network server of the present invention Next, operation of a server including the above described elements will be described.

The CPU, on the service side, receives a demand for service from a user and executes the filing program stored in the memory area for filing program 33 to process the demand. The demand itself is stored in the memory area for filing 32 along with a predetermined specification for the service. The CPU checks the bytes of the memory area for filing 32 one by one to locate a demand for service. When the filing program finds a demand for service, it extracts the corresponding data from the memory area for filing 32. The data to be extracted are processed by a service program, which is selected as the demand requires. For example, when in the case that the stored data are English text and a demand requires translation of the stored data to Japanese, a translation program is selected and executed to translate the required text into Japanese. The function of the file server program, which is stored in the information interchange area 35, will be explained later in detail.

The result data resulting from the requested service, which is performed by a program stored in the memory area for service program 36, are stored again in the memory area for filing 32. This storage is accomplished sometimes in combination with the raw data from before execution of the service. The result data of the process are handled by the function stored in the information interchange area 35. The function for utilizing the file server is initiated to have a unit of one data, which controls the below listed processes in the service:

a) data extraction from the memory area for filing 32 with the filing program, b) data interchange between each service program and data receiving from the processing unit, and c) storing the result data to the memory area for filing 32 by the filing function.

The operation program stored in the memory area for control program 37 controls the filing function stored in the memory area for filing program 33, and also controls scheduling of data processing utilization for the aforesaid file server and service program.

(iii) Pictures on the display at a user as a client

The following is an explanation of the operation in the client side as shown in FIG. 1. Herein, the "client side" refers to the side in which the receiver of the service of the network is located, in other words, where a work station is located. FIG. 1 shows pictures on a terminal display of a user work station on the client side.

FIG. 1 further shows a first picture 45 at the entry point of the service on a display 41, a picture 42 of a list of the services available, which may be unfolded from the entry point, and a picture 43 of a data list for the selected service which is further unfolded from the list of the service.

Herein, for example, a file drawer icon 45 on the screen 41 of FIG. 1 serves as an interface for the service. As for the interface for utilizing services of the system, the same one for the file server in the network system is also applied. Thus, file services also may be selected by pointing to the file menu one by one or by pushing a function key to select the required service. Selection by pushing function keys can be effected either with a physical keyboard or a visual keyboard drawn on the screen.

When a user requires a service from the aforesaid server 31, the file drawer icon 45 is accessed and the service list 42 is displayed on a screen of a terminal by use of a mouse or a keyboard (neither of which is shown in the figure) as a pointing device. File drawer icon 45 can be easily selected with a cursor 46. Herein, the file drawer icon 45 is used from the network control icon 47 in the network control program.

Service list window 42 contains not only the list of available services such as "service A" or "service B", but also the "status" or "result" of the various services. Herein, the word "status" corresponds to the folder containing a history and status of every service that has been used by the terminal. The word "result" corresponds to a folder in which the result of the service has been stored, classified by the kind of the service, or without any classification.

When a user selects "service A" for the unfolded step, a data list window is displayed on the screen. In FIG. 1 a table of the data that is waiting for the "service A" to be processed is displayed in the data list window 43. When the user desires to perform the "service A" on the data "X", the user selects the data "X" to be processed by the "service A". Data "X" is specified by putting the data "X" in a queue of the "service A" as shown in the figure.

Putting the data "X" in the queue of the service, is executed with an interface to use the file server, which is stored in the client system.

Although FIG. 1 shows a single layer structure for the service, the service can have a multi-layer structure.

With regard to the method for receiving the result of the service, it can be attained with the same manner for the file server as was described above. The result of the service was stored in a result folder (not shown) with or without the raw data. The user can extract the result with the predetermined interface.

Figure 2:
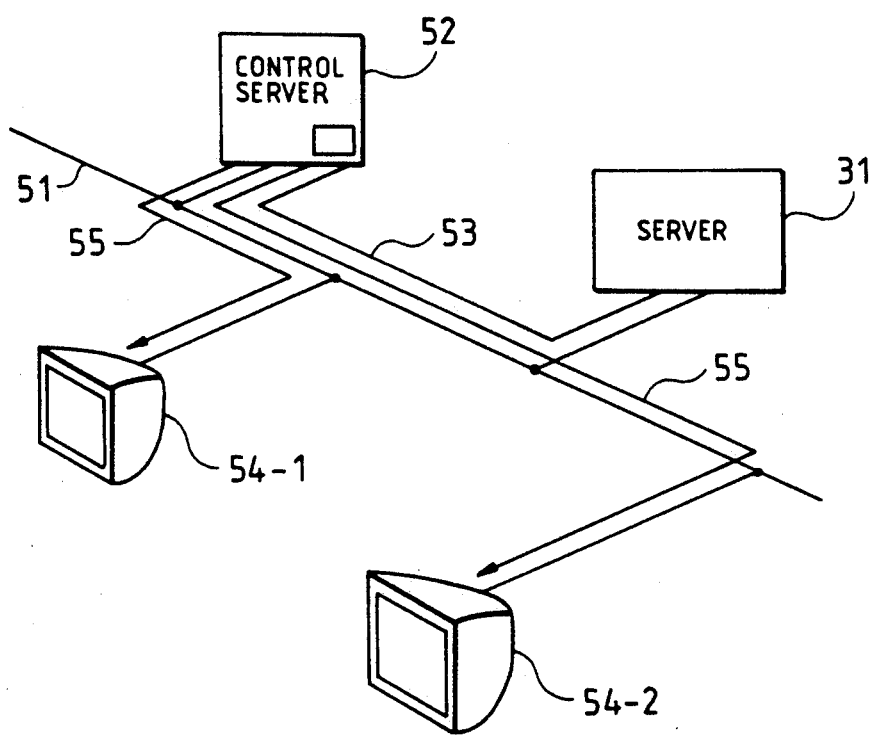
FIG. 2 shows a structure of a network.

FIG. 2 explains the addition and removal of the server of the present invention to and from the network. To add a new server 31 by which a new service is supplied, the new server 31 is connected to the bus cable 51 of the network system. Then the address for the server 31 is registered under the name of the server 31 in a network control server 52, as shown by a line 53 of FIG. 2. This registration is usually accomplished manually by a system operator. However, it can be done automatically by a software program in the system.

After the completion of the registration of the aforesaid server 31 with the network control server 52, the users who require the newly added service extract the service information, such as icons, from the network control server 52 to the work stations 54 of the user as shown by the line 55 of FIG. 2.

(iv) Introducing a temporary storage area

Although the system illustrated in FIG. 1 contains a temporary storage area 34, such a temporary storage area is not always required in this kind of system. However, the following merits are attained when one is provided:

(a) When there are sets of data waiting to be serviced by the server 31, a user's request for first priority service execution cannot always be satisfied immediately. The existence of the temporary storage area 34 in the server 31, allows the sets of waiting data to be stored temporarily until the first priority requirement can be accomplished with the re-scheduling of the services, and (b) The demand for quick response to the processed result of the service can be decreased with the temporary storage area 34.

The temporary storage area 34 is arranged between the information interchange area 35 and the memory area for service program 36. When there is no temporary storage area 34, the file server, which is stored in the information interchange area 35, usually executes a filing program in the memory area for filing program 33 after a completion of an execution of the specified service program stored in the memory area for the service program 36. However, when there is a temporary storage area 34, the aforesaid file server can move the system operation to the filing program and the user's scheduling requirement can be attained. In this case, the control program makes a schedule for the filing server function utilizing the file server and function for service program.

(v) The operation of the information interchanging means

Figure 3:
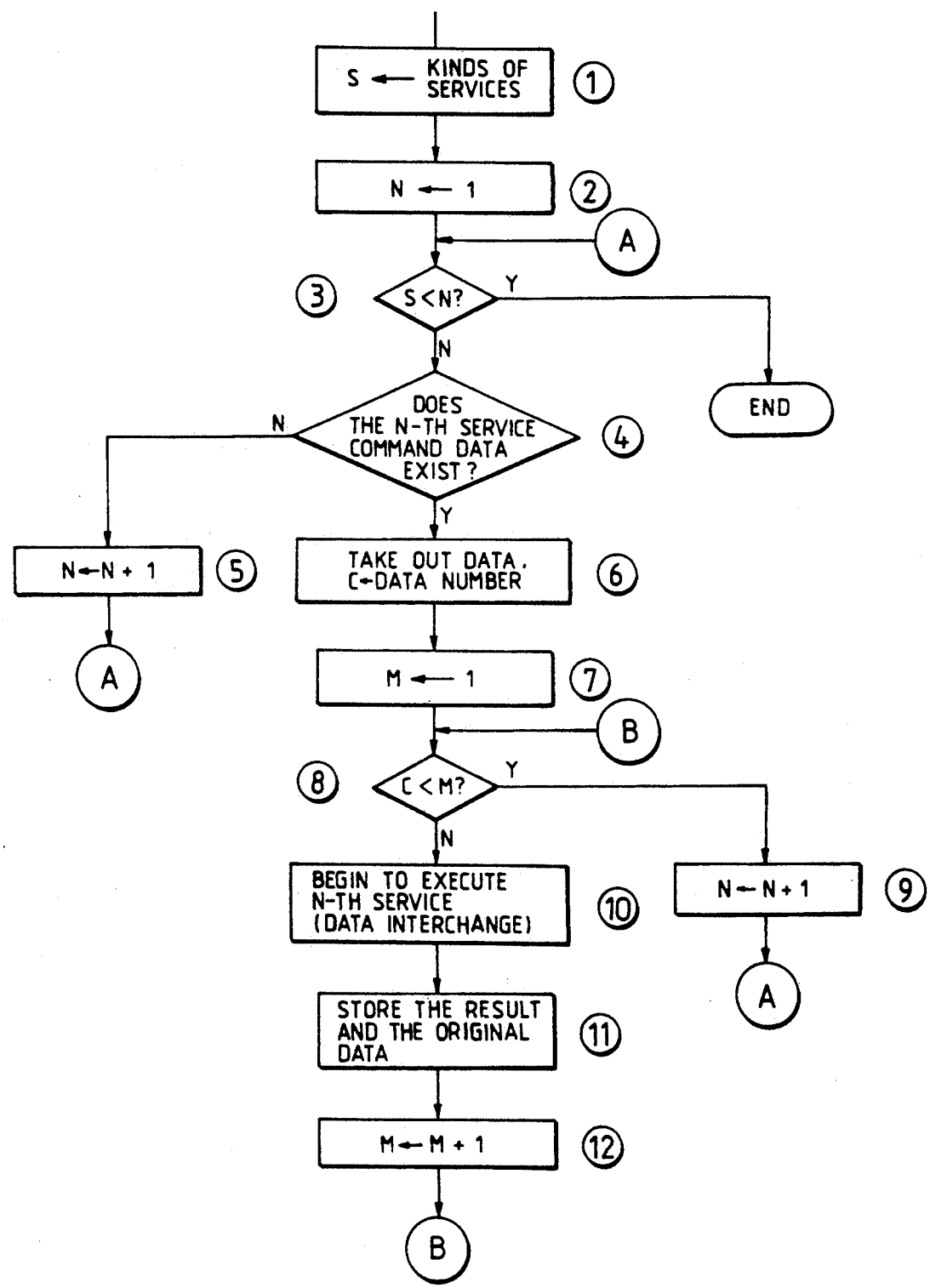
FIG. 3 is a flow chart showing the operating process of a function for the file server, which is stored in an information interchange means in the network system.

FIG. 3 is a flow chart of the operation of a function using the file server, which is stored in the information interchange area 35. Herein, the explanation will be made for the simplest case of orderly scanning in the memory area for filing.

In step 1, the aforesaid CPU in the server 31 stores the number of services which are to be executed as a number "S" in a counter (which is not illustrated in the figure) in the aforesaid temporary storage area 34. Then, in step 2, it sets a number "N" in another counter (not shown) in the aforesaid temporary storage area to "1". Next, the CPU checks if the number "N" is larger than the number "S" in step 3. When "N" is larger than "S", no further service is required by users and the procedure is completed. When the result for the logical operation in step 3 is "NO", the CPU determines, in step 4, whether the data still remains by which the Nth operation is commanded. When there is no demand for the service, i.e., when the result of the logical operation in step 4 is also "NO", the number "N" is incremented, and control returns to step 3.

Conversely, when there is an Nth demand for the service in step 4, i.e., when the result of the logical operation in step 4 is "YES", the CPU extracts the data to be processed from the memory area for filing 32 and executes the required filing program stored in the memory area for filing program 33. At the same time, in step 6, the CPU prepares another counter "C" (not shown) in the aforesaid temporary storage area and sets it to the number of data items to be processed. In step 7, it also sets to "1" another counter, "M". Next, the CPU determines if the number "M" is larger than "C". When the result of the logical operation in step 8 is "YES", the number for the aforesaid counter "N" is incremented in step 9. Finally, control returns to step 3.

When the result of the logical operation in step 8 is "NO", the Nth service is executed and the data interchange for the job is processed in step 10. After the completion of the job, for example, a translation service on the specified data, the result data and raw data are stored together in the memory area for filing 32 with a function of the filing program in step 11. The number of the aforesaid counter "M" is incremented in step 12, and control returns to step 8.

In addition to the simplified scheduling described above, more sophisticated control can be attained for the scheduling of the three function such as (a) filing service for the network, (b) function utilizing file server and (c) processing unit for the service, in addition to introducing the aforesaid temporary storage area.

(vi) Another example of the filing service

Figure 4:
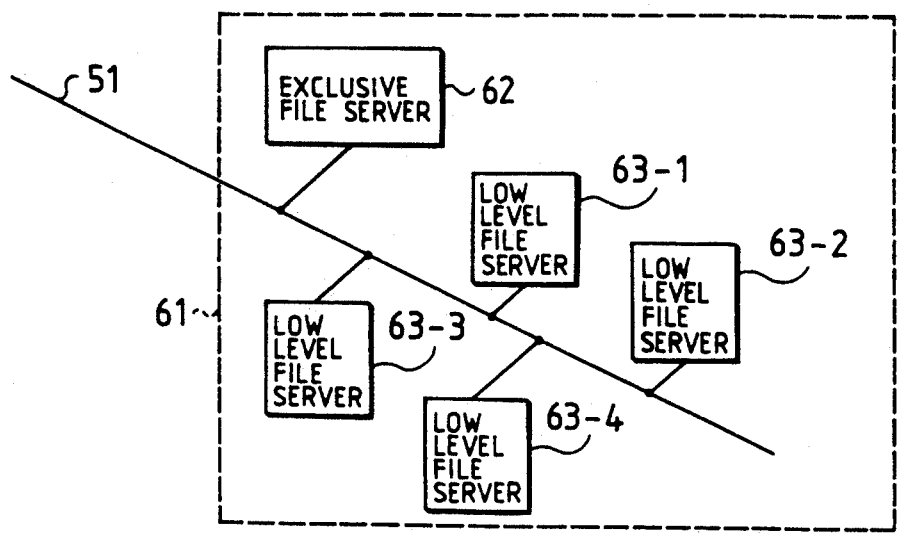
FIG. 4 shows a structure of another network incorporating the network server of the present invention.

FIG. 4 shows another example of the multi-node network system in which the new server is contained. A new server 61 in this example is made up from the servers of a lower layer. Herein, exclusive file server 62 and plural low layer servers 63 are connected to the bus cable 51. The aforesaid low layer servers 63 need not have memory area for filing or a function for filing individually. The layer server 63 includes:

(a) The first low layer server 63-1 is a server with which a "service A" is accomplished in a "language A", (b) The second low layered server 63-2 is a server with which a "service B" is accomplished in a "language B", (c) The third low layered server 63-3 is a server with which a "service C" is accomplished in the "language A", and (d) The fourth low layered server 63-4 is a server with which a "service D" is accomplished in a "language C".

The above mentioned multi-node structure for the servers themselves has the following advantages:

(1) When the program is large and takes a comparatively long time to execute, execution time for the service can be minimized with concurrent processing, as the program of the service can be divided into simplified blocks, (2) When there are many kinds of services available, the same effect can be attained with the same method as was described in (1), (3) When the service program is written in many different high-level languages, the same effect can be attained with division of the program into blocks of the same language, and (4) When the frequency of demand for the new service is higher, execution time of the service can be reduced by dividing the program for concurrent processing between multiple clients.

(vii) Another example of the data interchange function

Figure 5:
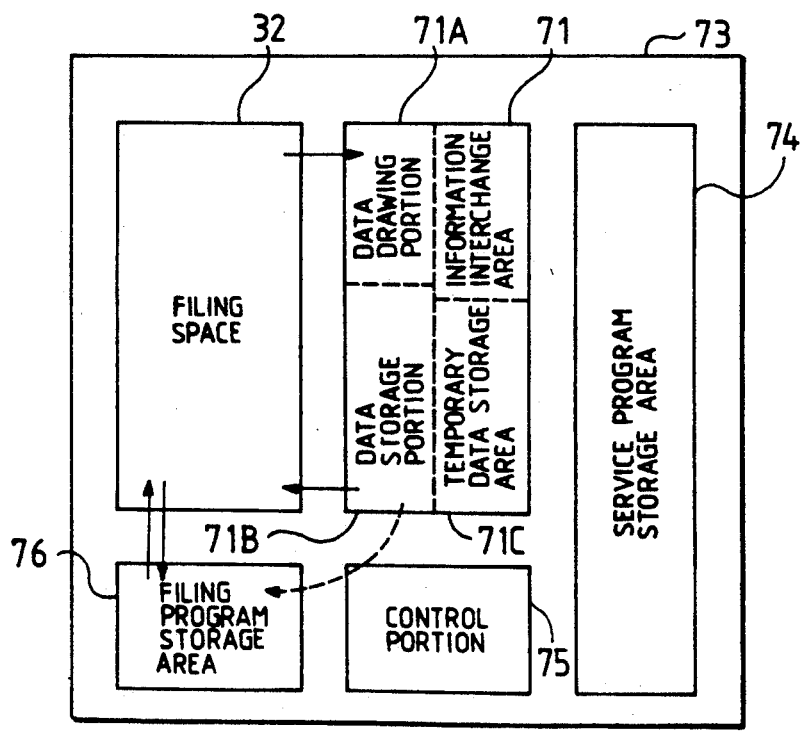
FIG. 5 shows another example of the network server in accordance with the present invention.
Figure 6:
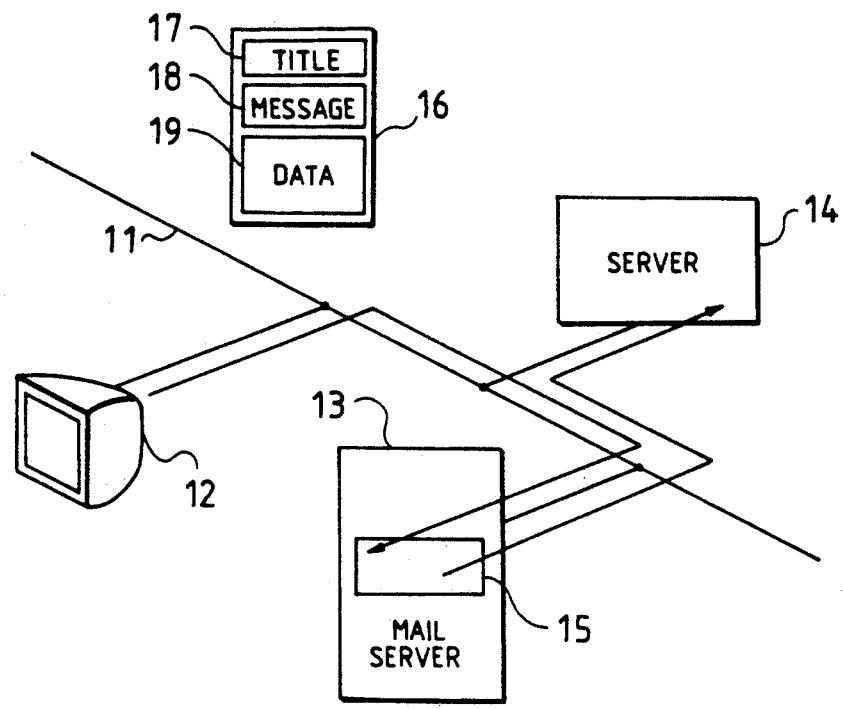
FIG. 6 shows a structure of a first system of the prior art.
Figure 7:
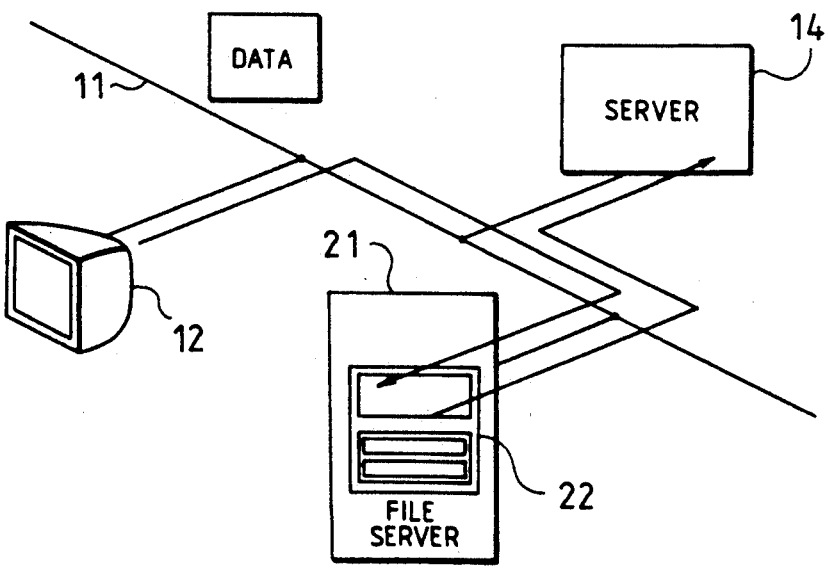
FIG. 7 shows a structure of a second system of the prior art.

FIG. 5 shows another preferred embodiment of the server described in FIG. 1. In this example, the data interchange function includes a data drawing means 71A, a data storage portion 71B, and a temporary data storage area 71C. The data drawing portion 71A extracts data from the memory area for filing 32. Conversely, the data storage portion 71B stores the processed data to the memory area for filing 32. The service program storage area 74 corresponds to the memory area for service program 36 in FIG. 1, and the control portion 75 corresponds to the memory area for control program 37 in FIG. 1.

As was described above, in this server 73, the data interchange function handles the required data directly from/to the memory area for filing 32 without intervention by the filing program in filing program storage area 76. Because of this structure in this example of server 73 the scheduling of the controller can be simplified especially for the multi-process structure, as the filing program becomes exclusive to the network.

(viii) Mail service system

The present invention has been described above for the filing service only. However, the server in accordance with the present invention also can be applied for a mail service, as will be explained below.

In existing mailing services, a mail box for each user is separately prepared. Accordingly, result data from the service are sent to each mail box, causing system activity to increase and decreasing the credibility of the system.

To overcome the problem, a special mail box, which is characterized as a mutual private mail box, is prepared in each server. Hereinafter, the aforesaid special mail box is called a "mutual mail box". By this "mutual mail box", the same effect can be attained as for the filing service described above.

The "mutual mail box" in this embodiment comprises a memory area for a mail service program in which the mail service program for the server side is stored (instead of in the memory area for filing program 33 of FIG. 1). The memory area for filing 32 in FIG. 1 is replaced with a mail box. The aforesaid mail box can have a structure of one box to be used as a storage area, or a structure of two boxes, one to be used as a storage box for required data and another to be used as a storage box for processed data. In the "mutual mail box", the determination of the kind of required service should be done by the mail server utilizing a function stored in the memory area for result data 35. In addition to the aforementioned requirement, an icon in the user side, such as a kind of mail server icon, should be prepared instead of the file drawer icon 45. This mail server icon allows access to the "mutual mail box", since, when the private mail boxes are also arranged in the system, the different mail box for this purpose should be prepared separately. The mail server icon should be extracted from the network control server 52 in FIG. 2 to be a server to control the whole network.

As was described above, each server except the file server has a function and storage area for data filing for as long as it needs the function. Thus, a server is passive for the total network and can not only prevent the propagation of errors in the server through the whole network, but also can provide a flexibility to realize various service.

In addition, as the servers themselves contain the filing function, these servers can connect to the network and perform a communication test for the network with the same specification for the file server. This ability results in a reduced time interval for developing the server. With regard to the filing function, which is the most advanced basic protocol function for the standardization of OSI, wide adaptability can be obtained by employing it as a base protocol for the network.

Also, the server according to the present invention can be added to and removed from the network to register and cancel the name of the file server in the service for the network control. Furthermore, variations of application services can be built into the network with the same credibility as the basic services such as file server and print server in the prior art technique. This results in a more dependable network even when the network becomes more complicated.

Moreover, when, for example, the server of the present invention, is applied to the automated vending machine type network service, and to bill collecting for the services, periodic maintenance and withdrawal of the hardware to be repaired can be attained with the same manner to the vending machine in the prior art. In future, as the diversification of the services increases, it is useful for any network to employ this kind of service.

With preparation of a function for an electronic mailing service which is attained by the server itself and an electronic mail box to store the aforesaid electronic mail, the service is perfectly passive for the network itself as long as the aforesaid electronic mail box is used. This attain not only an effective prevention of the propagation of errors in the network, but also the aforesaid merits described in this specification.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. A server for a communication network, comprising:
   a file server for sending and receiving files to and from the communication network, for storing said files, and for analyzing a user's request;
   means, connected to said file server, for storing a plurality of predetermined service programs whose identifying data are stored in said file server; and
   processing means for executing a selected one of said plurality of predetermined service programs using a selected one of said files stored in said file server.

2. The server of claim 1, wherein said processing means comprises:
   a service processing unit for executing a selected one of said plurality of predetermined service programs; and a result storage means for storing a result of the processing by said service processing unit.

3. The server of claim 2, wherein said server further comprises:
a temporary information storage area for temporarily storing data to be interchanged between said file server and said service processing unit.

4. The server of claim 2, further comprising:
control means for scheduling an order and a time for performance of one of said plurality of predetermined services by said service processing unit.

5. The server of claim 3, further comprising:
control means for scheduling an order and a time for performance of one of said plurality of predetermined services by said service processing unit.

6. A server for a communication network, comprising:
means for storing request files received from said communication network;
means for storing a plurality of predetermined service programs made available through the communication network;
means for processing said request files by reading a requested one of said plurality of predetermined service programs from said service program storing means and executing said requested service program; and
means for storing the results of each processed request file sent thereto by said processing means.

7. The server of claim 6, further comprising:
control means for scheduling an order and a time for execution of one of said plurality of predetermined service programs by said processing means.

* * * * *